(12) United States Patent
Miedema

(10) Patent No.: US 11,353,924 B1
(45) Date of Patent: Jun. 7, 2022

(54) ENCAPSULATED GRAPHICAL DISPLAYS WITH MOLDED BEZELS

(71) Applicant: CSE, Inc., Norton Shores, MI (US)

(72) Inventor: Gregory A. Miedema, Spring Lake, MI (US)

(73) Assignee: CSE, Inc., Norton Shores, MI (US)

( * ) Notice: Subject to any disclaimer, the term of this patent is extended or adjusted under 35 U.S.C. 154(b) by 0 days.

(21) Appl. No.: 16/441,746

(22) Filed: Jun. 14, 2019

Related U.S. Application Data

(60) Provisional application No. 62/684,989, filed on Jun. 14, 2018.

(51) Int. Cl.
| | |
|---|---|
| *G02F 1/13* | (2006.01) |
| *G06F 1/16* | (2006.01) |
| *G02F 1/1335* | (2006.01) |
| *G06F 3/041* | (2006.01) |
| *G02F 1/13357* | (2006.01) |

(52) U.S. Cl.
CPC ...... *G06F 1/1637* (2013.01); *G02F 1/133526* (2013.01); *G02F 1/133603* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 6,370,037 B1 * | 4/2002 | Schoenfish | ........... | H05K 5/0204 174/542 |
| 6,388,881 B2 * | 5/2002 | Yamauchi | ........... | B60H 1/00985 361/704 |
| 6,414,781 B1 * | 7/2002 | Saitoh | ............... | G02F 1/133308 359/245 |
| 6,629,716 B2 * | 10/2003 | Shibata | ................... | B60K 37/06 296/70 |
| 6,709,041 B1 * | 3/2004 | Hotary | ................... | B60K 37/00 296/70 |
| 7,084,932 B1 * | 8/2006 | Mathias | .............. | B60R 11/0211 296/37.7 |
| 7,210,725 B2 * | 5/2007 | Moore | .................. | B60K 37/00 296/37.8 |
| 9,914,407 B2 * | 3/2018 | Zeiger | ................ | B60R 13/0256 D14/258 |
| 10,775,657 B2 * | 9/2020 | Inoue | ...................... | B32B 17/00 |
| 2012/0170179 A1 * | 7/2012 | Aumiller | ............... | G06F 1/1637 361/679.01 |

(Continued)

*Primary Examiner* — Anthony Q Edwards
*Assistant Examiner* — Rashen E Morrison
(74) *Attorney, Agent, or Firm* — Gardner, Linn, Burkhart & Ondersma LLP

(57) ABSTRACT

A console panel includes a housing and a display device. The console panel is configured to fit in an opening of an automotive console or dashboard. The housing is configured to retain and support the display device within the housing. The housing comprises a retaining portion configured to position and retain the housing within the opening. The retaining portion is an encapsulation portion that is disposed about at least a portion of the perimeter of the housing. The encapsulation portion includes a retention feature configured to retain and support the housing within the encapsulation portion. The housing further includes a complementary retention feature. The retention feature is configured to at least partially engage with the complementary retention feature.

21 Claims, 10 Drawing Sheets

(56) References Cited

U.S. PATENT DOCUMENTS

| | | | |
|---|---|---|---|
| 2014/0200765 A1* | 7/2014 | Waeller | B60W 50/0098 |
| | | | 701/36 |
| 2015/0027016 A1* | 1/2015 | Best | G09F 23/00 |
| | | | 40/711 |
| 2016/0164561 A1* | 6/2016 | Brey | B60R 11/0205 |
| | | | 455/73 |
| 2017/0015251 A1* | 1/2017 | Arendsen | B62D 65/14 |
| 2017/0034939 A1* | 2/2017 | Fike, III | H05K 3/30 |
| 2018/0259807 A1* | 9/2018 | Yuuki | G02F 1/133606 |
| 2019/0101787 A1* | 4/2019 | Inoue | C03C 15/00 |
| 2019/0134940 A1* | 5/2019 | Inoue | G02F 1/1333 |
| 2019/0157023 A1* | 5/2019 | Thrien | B60K 37/06 |
| 2019/0301594 A1* | 10/2019 | Wang | F16H 63/42 |
| 2019/0321636 A1* | 10/2019 | Law | A61N 1/0456 |

\* cited by examiner

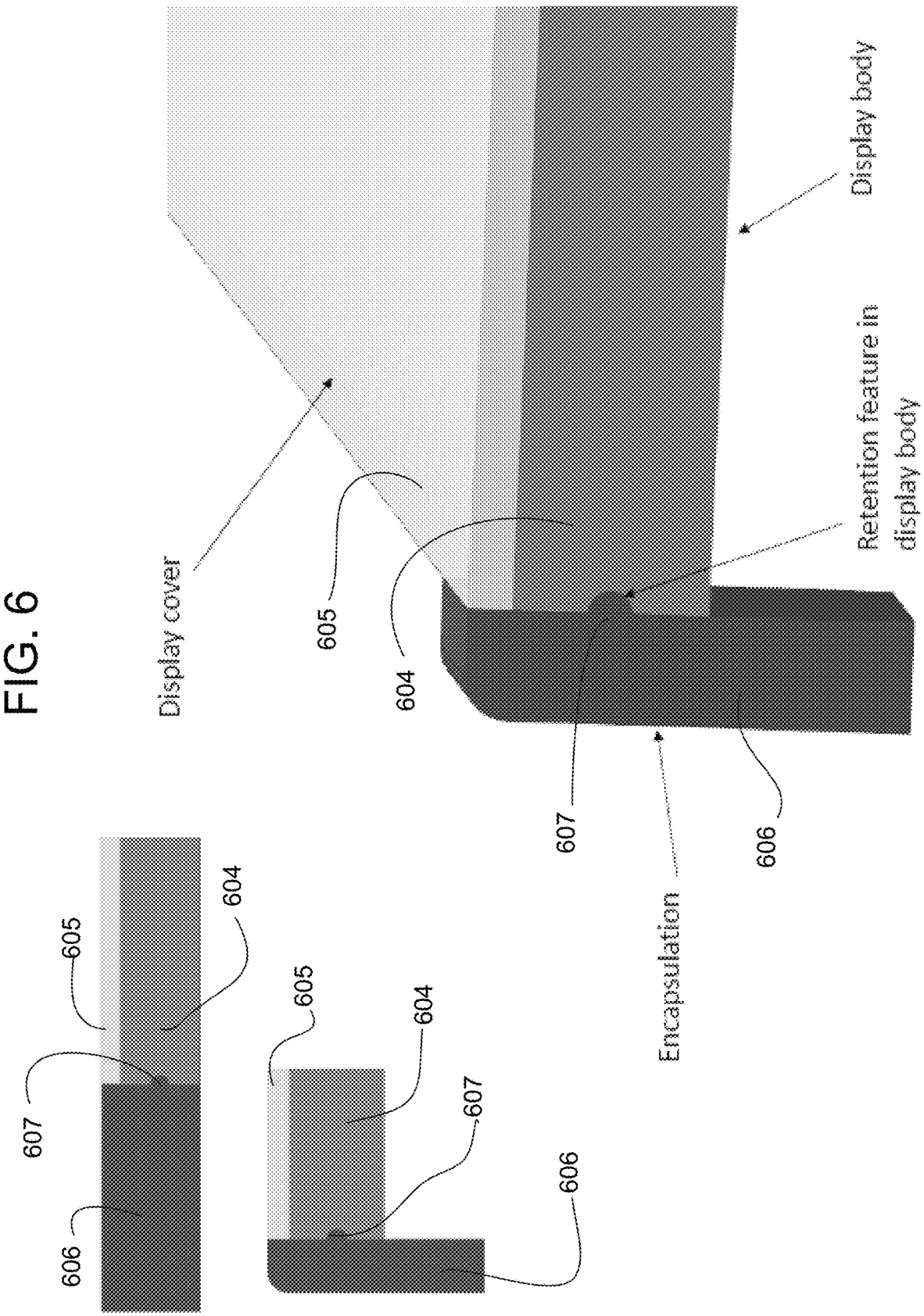

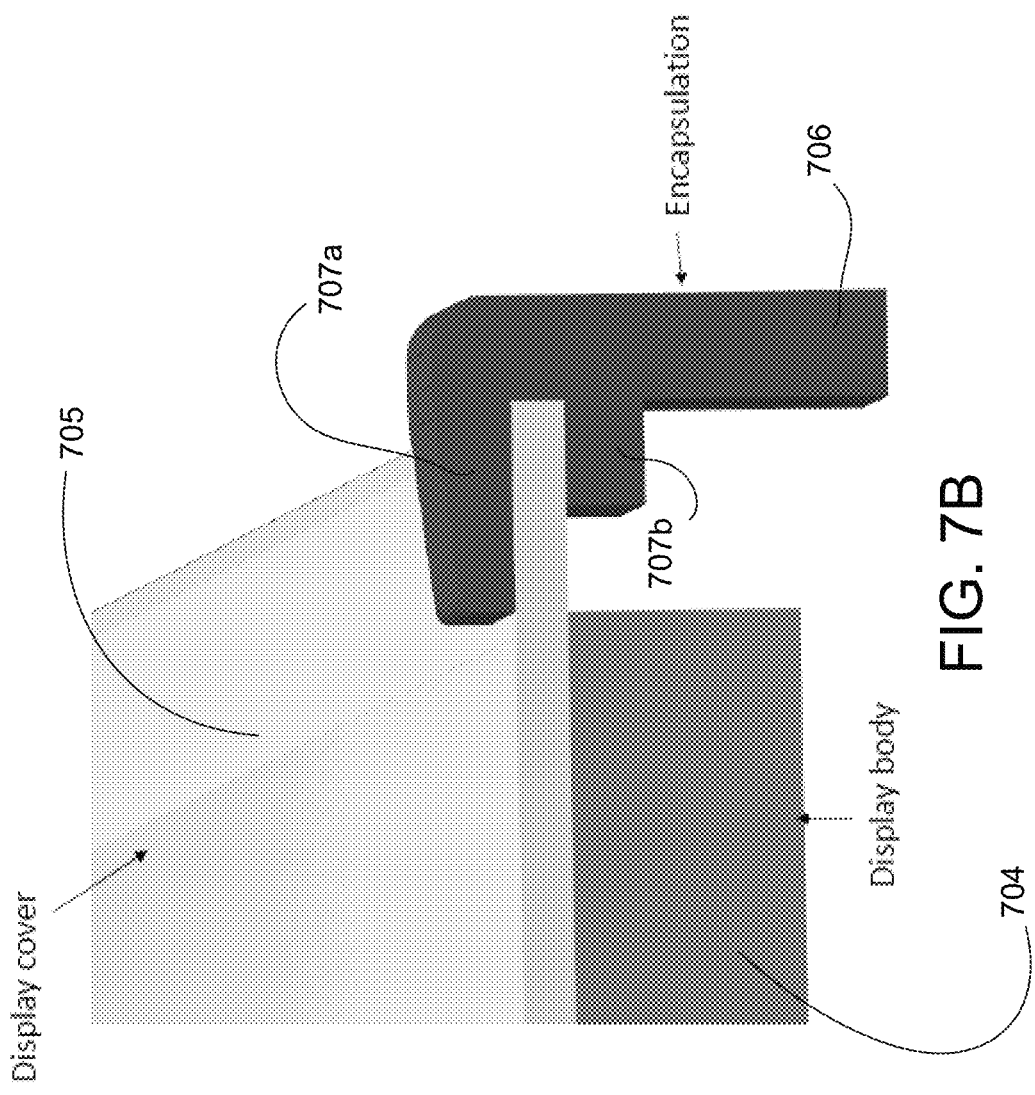
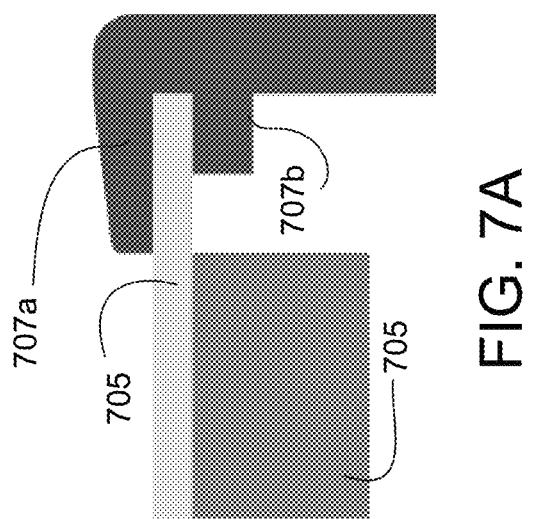
FIG. 7B
FIG. 7A
FIG. 8

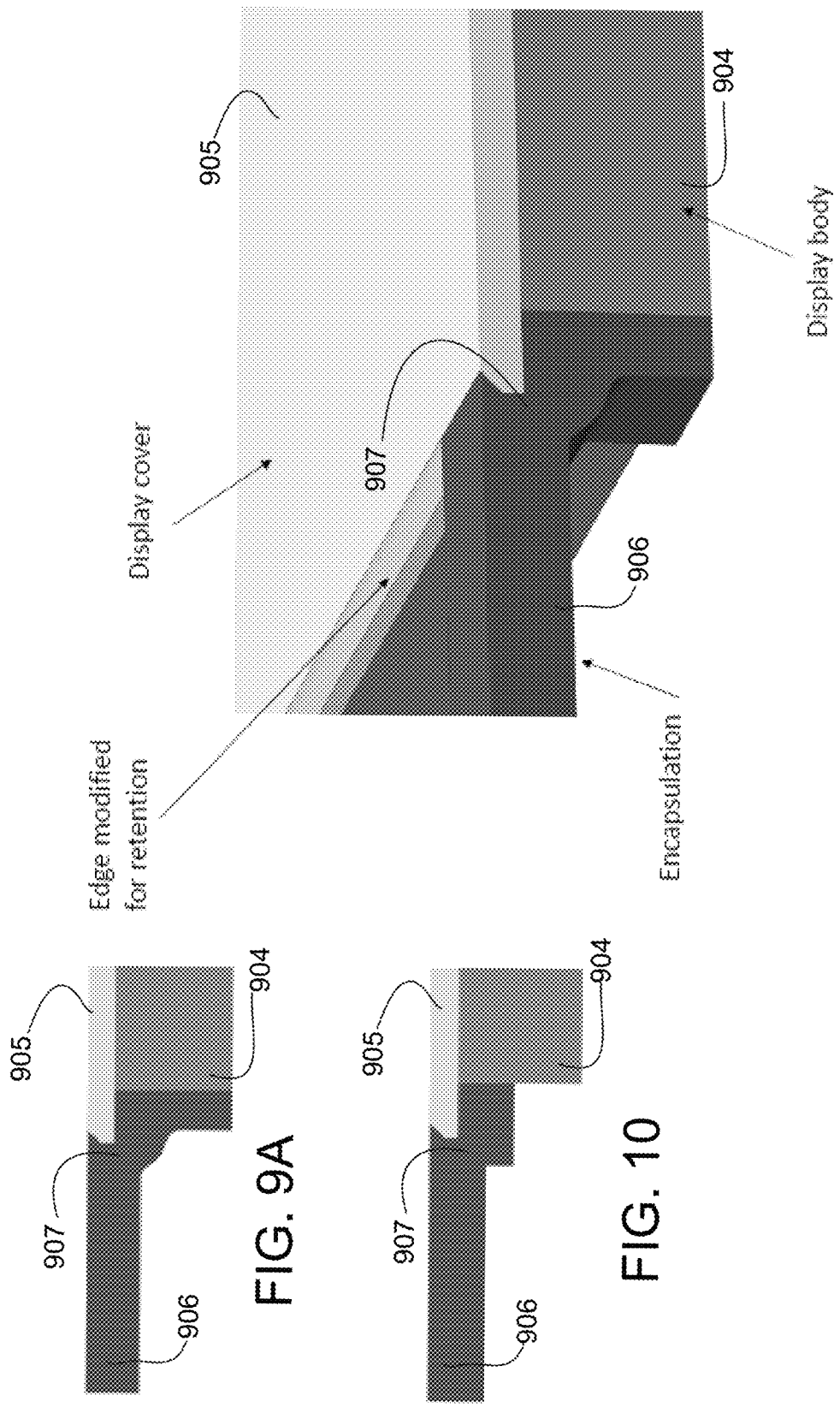

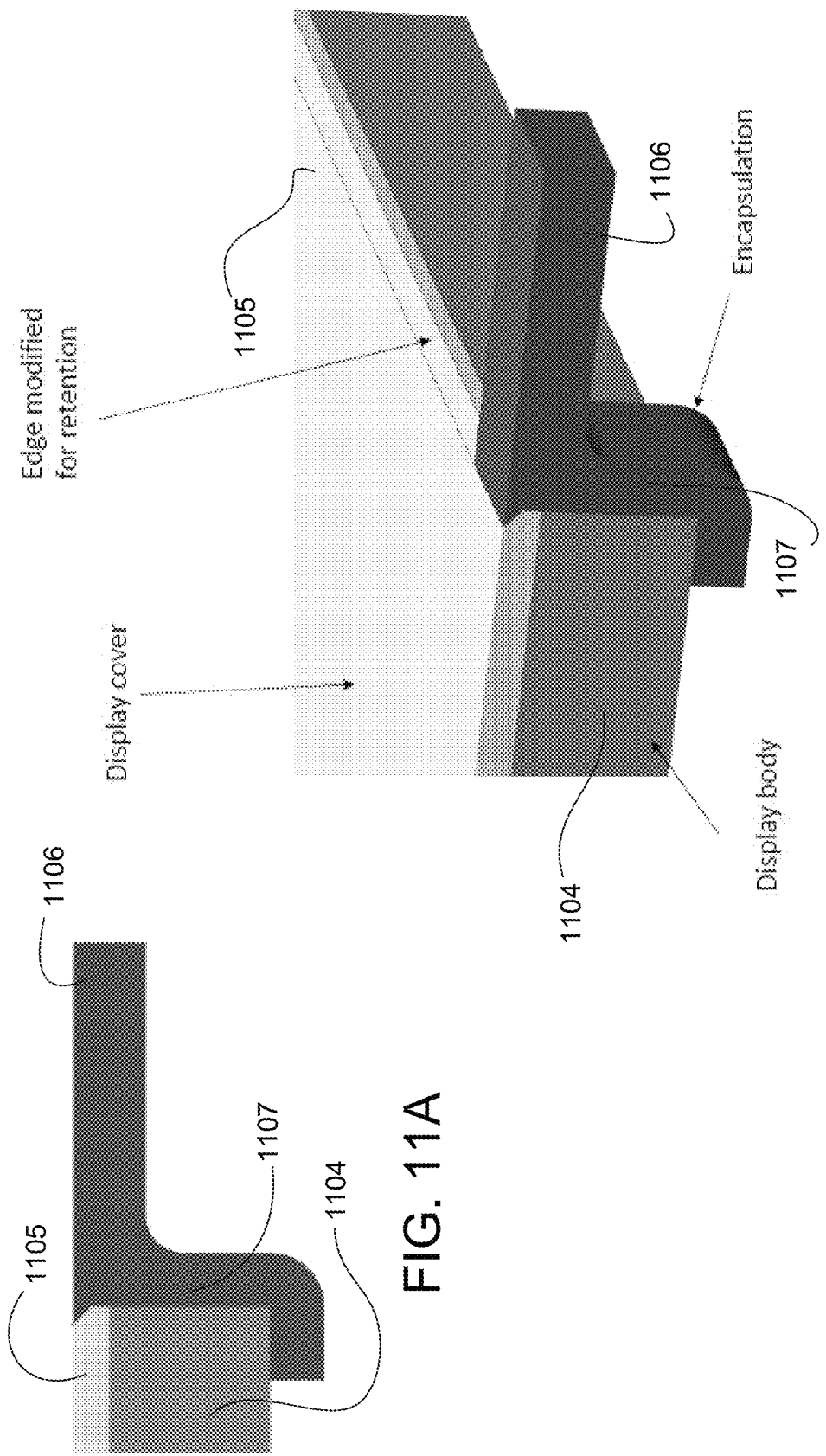

ENCAPSULATED GRAPHICAL DISPLAYS WITH MOLDED BEZELS

CROSS REFERENCE TO RELATED APPLICATIONS

This application claims the filing benefits of U.S. provisional application, Ser. No. 62/684,989, filed Jun. 14, 2018, which is hereby incorporated herein by reference in its entirety.

FIELD OF THE INVENTION

The present invention is directed to display systems, and in particular, encapsulated display systems with molded bezels, as well as replacement display systems for use in other applications.

BACKGROUND OF THE INVENTION

Conventional automobile dashboards or consoles typically contain one or more display systems, instrumentation panels, and control panels. Display systems are typically mounted in the center of the dashboard or console, and can also be mounted in headrests or other locations. Such display systems typically contain radio systems, navigation aids (e.g., global positioning satellite (GPS) receivers), climate controls, and other functionality and/or controls, including to display images from external cameras, as well as for other purposes. Conventional display systems are typically original equipment installed by the automobile's manufacturer or suppliers.

SUMMARY OF THE INVENTION

The present invention provides for a display system mounted to an automobile, such as but not limited to mounted in the console or dashboard, the rear of a vehicle headrest or seat, interior header, inner door panels, an interior mirror location and/or an exterior portion of the vehicle, such as at or on an exterior pillar of a vehicle or an exterior panel of the vehicle, such as a door or quarter panel, or the location of an exterior mirror. The display system may be implemented as an encapsulated display system that includes a molded encapsulating bezel for mounting to the automobile. The encapsulated display system may be implemented with a variety of bezels formed from a variety of molded encapsulation methods. A molded bezel may be provided in a variety of dimensions to allow a single encapsulated display system to be installed, such as but not limited to installing into an opening of an automobile console or dashboard, a rear seat, interior header, or other opening on or about a vehicle, including an exterior opening such as on a pillar of the vehicle, such as an A-, B- and/or C-pillar, or on or at an exterior body panel of a vehicle, such as a front or rear quarter panel or a door, a fascia, or other location. Moreover, the encapsulated displays may be employed in different applications.

In a console panel configured to fit in an opening of an automobile console in accordance with the present invention, the console panel includes a housing. The housing includes a display device that is retained and supported within the housing. The housing includes an encapsulation that surrounds a perimeter of the housing and is configured to position the housing within the opening of the console. The encapsulation includes a retaining portion that retains and supports the housing within the encapsulation.

In a display system in accordance with the present invention, the display system includes a body portion and a display cover. At least a portion of the display cover is adhered to at least a portion of the body portion. The display system includes a molded encapsulation portion that is disposed about at least a portion of the perimeter of at least one of the body portion and the display cover. The molded encapsulation portion is configured to retain and support the body portion and display cover within the molded encapsulation portion. The molded encapsulation portion is molded to a top surface of the display cover and/or a bottom surface of the display cover and/or an edge surface of the display cover, with the molded encapsulation portion thereby being fixedly connected and retained with the display cover.

In an aspect of the present invention, a molded encapsulation portion includes a retention feature that is configured to engage with a corresponding complementary retention feature in at least one of a housing/body portion and a display cover. The retention feature on the molded encapsulation portion may be a projection extending into a corresponding channel, cavity or receptacle on one of the housing and/or body portions, or may be a projection on one of the housing and/or body portions that forms a mating channel, cavity or receptacle with the molded encapsulation portion.

In another aspect of the present invention, a molded encapsulation portion forms a bezel that can be sized to allow a display system to be positioned and retained within a variety of automobile openings with different dimensions, including consoles, rear seats, interior headers, inner door panels, as well as exterior openings such as on or at a pillar of the vehicle or an exterior body panel of the vehicle, including an exterior door of the vehicle.

In yet a further aspect of the present invention, a display cover adhered to a surface of a display body extends beyond the surface on at least one side.

The display systems of the present invention may be used to provide information to users and/or enable users to interact with the vehicle. With regard to encapsulated display systems, the encapsulation may be variably configured to fit a variety of openings, for example, the encapsulation of a display system may be sized to fit a particular opening in an automobile console or elsewhere. Still further, in the case of a replacement display system, an encapsulation of the replacement display system may be sized to fit a variety of existing openings in automobile consoles such that the replacement display system is able to replace original display systems. These and other objects, advantages, purposes and features of the present invention will become apparent upon review of the following specification in conjunction with the drawings.

BRIEF DESCRIPTION OF DRAWINGS

FIG. 6 illustrates side and side perspective views of a display body encapsulation with retention feature according to an embodiment of the present invention;

FIGS. 7A and 7B are a side view and side perspective view, respectively, of a display body encapsulation with retention feature according to an embodiment of the present invention;

FIG. 8 is a side view of a display body encapsulation with retention feature according to an embodiment of the present invention;

FIGS. 9A and 9B are a side view and side perspective view, respectively, of a display body encapsulation with retention feature according to an embodiment of the present invention;

FIG. 10 is a side view of a display body encapsulation with retention feature according to an embodiment of the present invention;

FIGS. 11A and 11B are a side view and side perspective view, respectively, of a display body encapsulation with retention feature according to an embodiment of the present invention;

DETAILED DESCRIPTION

Figure 1:
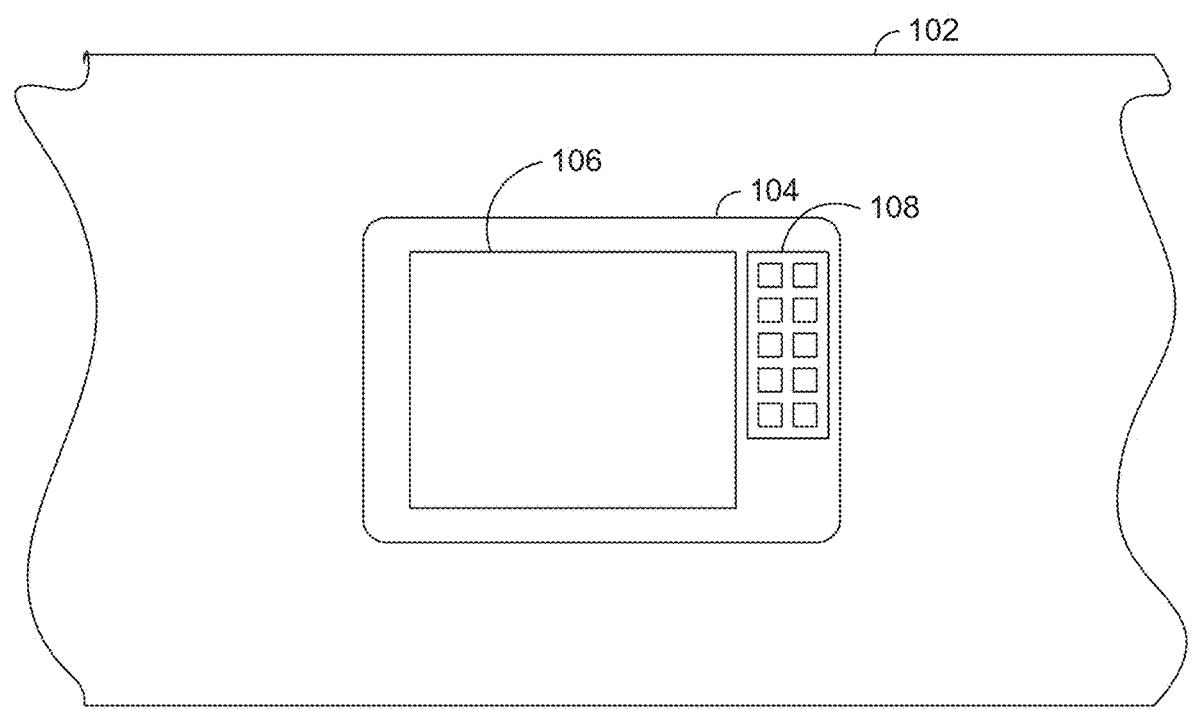
FIG. 1 is a front view of an automobile console with an console-mounted display system according to an embodiment of the present invention.

Referring now to the drawings and the illustrative embodiments depicted therein, an automobile console or dashboard may be equipped with a display system that includes a bezel for fitting the display system into an opening in the automobile console or dashboard, such as for original equipment as installed or as a replacement display system. As illustrated in FIG. 1, an automobile dashboard or console 102 includes a console display 104 that may include one or more electronic displays 106 and one or more user input controls 108. The electronic displays 106 may be implemented as liquid crystal displays (LCDs), light-emitting diode (LED) displays, organic light-emitting diode (OLED) displays, and active-matrix organic light-emitting diode (AMOLED) displays. Other electronic displays are also possible. The user input controls 108 may be input controls for controlling the electronic display(s) 106, or for inputting user commands for radios, climate control systems, or other user-controlled systems. The user input controls 108 may be implemented as a touch screen. Optionally, the user input controls 108 may be implemented as physical switches/buttons (e.g., keyboard keys, pad buttons, and microswitches). The console display 104 may be mounted to the automobile dashboard or console 102 via one or more fasteners or mounting hardware. The console display 104 illustrated in FIG. 1 may be an original display installed by the automobile manufacturer or an associated supplier (an original equipment manufacturer (OEM)).

Although discussed as a console mounted display 104, it should be appreciated that display systems in accordance with the present invention may alternatively be mounted in to a vehicle in a wide variety of locations for various applications. For example, but not limited to, being mounted to the rear of a vehicle headrest or seat as part of an infotainment system, mounted to the interior upper header, to the inner door panels and/or to an exterior portion of the vehicle, such as at the exterior B-pillar of a vehicle and/or to an exterior body panel of a vehicle, such as to a front or rear quarter panel, or at a location of an exterior mirror or an exterior door panel, where an exterior display system may be utilized to interactively receive information from a user and/or provide information to a user. The encapsulation of the display in accordance with the present invention provides for sealed displays that sufficiently resist inclement weather that might otherwise negatively impact or degrade the electronics of the display.

Figure 2:
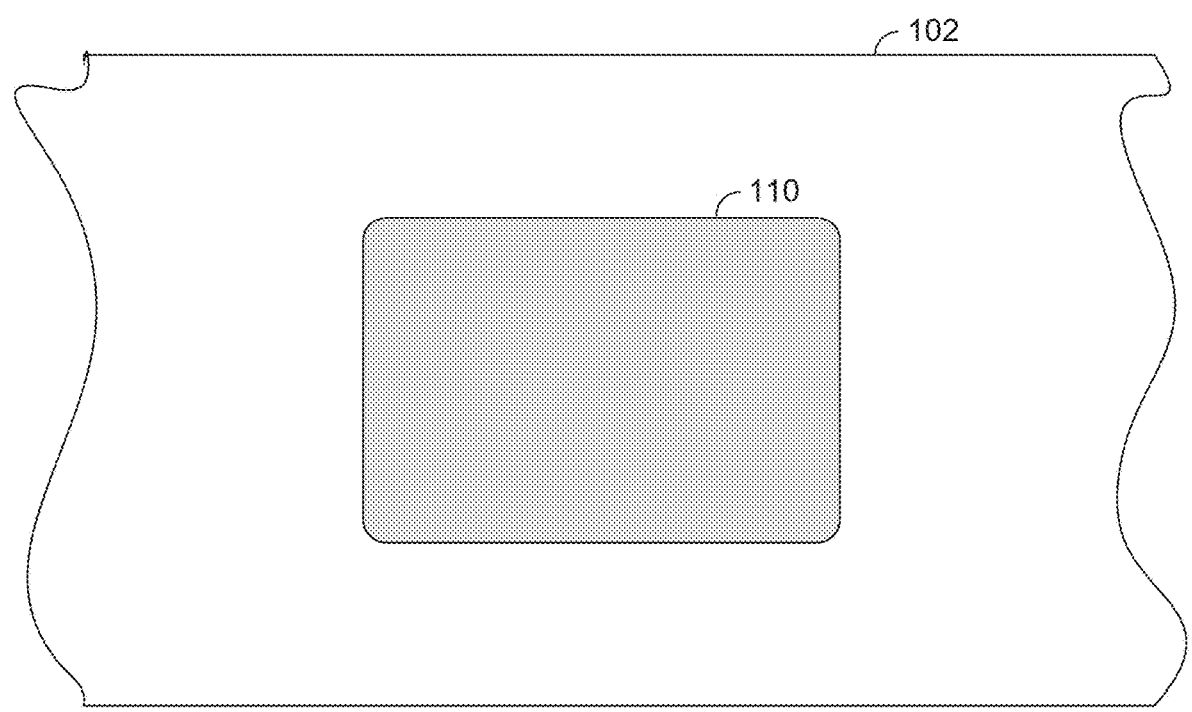
FIG. 2 is a front view of an automobile console with an opening in the console to receive a display system according to an embodiment of the present invention.
Figure 3A:
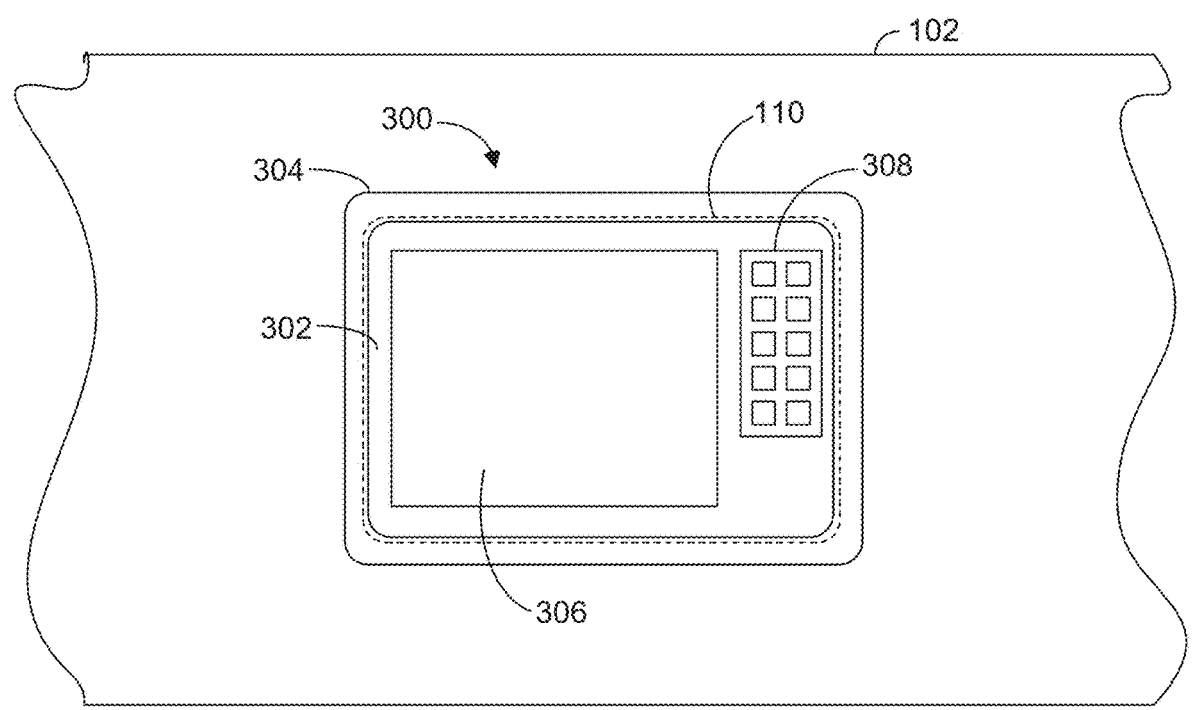
FIG. 3A is a front view of the automobile console of FIG. 2 with a display system installed according to an embodiment of the present invention.
Figure 3B:
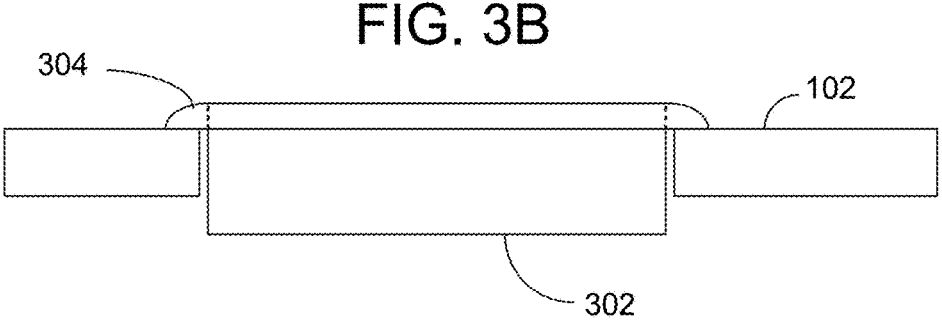
FIG. 3B is a side view of the display system of FIG. 3A installed in the automobile console according to an embodiment of the present invention.

FIG. 2 illustrates an exemplary opening 110 in the automobile dashboard or console 102 when the console display 104 has been removed. The opening 110 is sized to allow the console display 104 to be inserted and mounted in the opening 110. FIGS. 3A and 3B illustrate an exemplary display system 300 installed into the opening 110. The display system 300 includes a housing or display body 302 that may be constructed of a variety of materials, including, but not limited to: plastics, aluminum, aluminum alloys, steel, and steel alloys. As illustrated in FIGS. 3A and 3B, the housing 302 is surrounded by a bezel 304. As described herein, the bezel 304 is configured to retain the housing 302 within the bezel 304 through the use of one or more retaining features in the bezel 304 and one or more complementary retaining features in the housing 302. As illustrated in FIGS. 6-13, the bezels in accordance with the present invention may be implemented as an overmolded encapsulating perimeter retention portion. As described herein, the display system may also include a display cover that is affixed or adhered to a surface of the housing or display body 302, such that the display cover provides protection for a display screen of an electronic display 302. As also illustrated in FIG. 3A, the display system 300 may also include user input controls 308. The display system 300 may be used as a direct replacement of an original display system 104 with similar features, or the display system 300 may have a different arrangement of display(s) and user input controls than the original display 104.

The dimensions, spacing, and gaps between the automobile dashboard or console 102, and the replacement display system 300 are exaggerated for the sake of clarity. As illustrated in FIG. 3B, the bezel 304 rests against the surface of the automobile dashboard or console 102 and provides stability to the display system 300 when it is inserted into the opening 110. The display system 300 is mounted into the opening 110 through the use of one or more of adhesive tape, glue, snaps, and a retention member, which may be applied between the housing 302 and inner walls of the opening 110 and/or between an underside of the bezel 304 and a surface of the automobile dashboard or console 102. FIG. 3B illustrates that so long as the bezel 304 is sized to make contact with the automobile dashboard or console 102 on all sides of the display system 300, that the dimensions of the replacement display system 300 need not exactly match those of the opening 110 (so long as they are sufficient to allow the housing 302 of the display system 300 to be inserted at least partially into the opening 110. In other words, the bezel 304 (which securely retains the display system 300 within the bezel 304) may be sized such that the housing 302 of the display system 300 need not fit snuggly into the opening 110, nor be retained via the same fastenings or mounting hardware used by the original console display 104.

Figure 4:
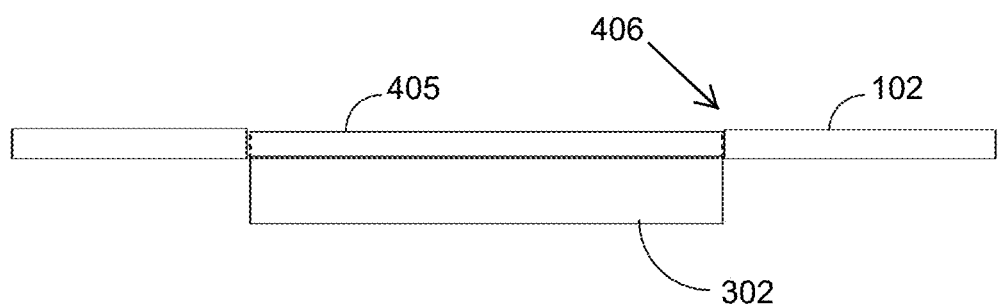
FIG. 4 is a side view of the display system of FIG. 3A installed in a display body encapsulation with a retention feature according to an embodiment of the present invention.

In an alternative embodiment illustrated in FIG. 4, a panel is molded to the display screen to form the automobile dashboard/console 102, or other similar surface, which is configured to include an encapsulating retaining portion 406, such that the housing or display body 302 of the display system 300 is retained within the dashboard/console 102. That is, there is no opening (110) in the dashboard/console 102, instead, the encapsulating retaining portion 406 of the dashboard/console 102 is configured to surround the display body 302 of the display system 300. As discussed herein, the encapsulating retaining portion 406 may be configured to encapsulate and retain the display body 302 and/or a display screen 405 of the display 300 and thereby incorporate a bezel, as discussed herein. Although discussed with regard to FIG. 4 as a dashboard/console, it should be appreciated that alternative panels can be molded to a display screen, such as display screen 405, where the panel includes not only the bezel surrounding the display screen 405, but additionally extends beyond that to define a component that can be installed on the vehicle. Such a panel has an exterior perimeter sized for installation on the vehicle, such as the center console or a headrest panel. Accordingly, rather than a console/dashboard or a headrest including an opening within which an encapsulated display is inserted, the display is encapsulated with the member or panel defining the console/dashboard, headrest or the like.

Figure 5:
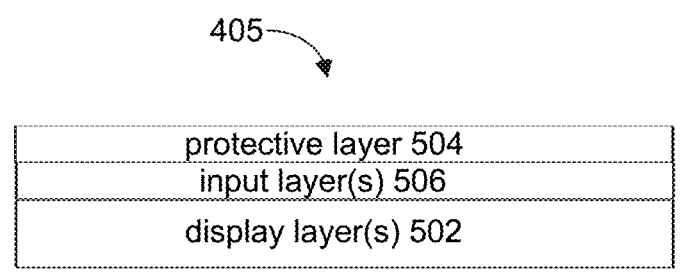
FIG. 5 is a cross-sectional view of the layers of an exemplary display screen according to an embodiment of the present invention.

An exemplary display screen 405 can comprise a plurality of layers. As illustrated in FIG. 5, the display screen 405 can comprise a light-emitting diode (LED) layer 502, which may comprise multiple layers. Such LED layers 502, and other display technology (e.g., liquid crystal displays (LCD)), hereinafter referred to as "display layers," will typically be coupled to display electronics in the display body 302. Such display electronics drives the display layers 502. A typical display screen 405 may then include one or more protective layers 504 positioned above the display layers 502. Optionally, an input layer 506 can be sandwiched between the display layers 502 and the protective layer 504. This input layer 506 typically provides the input function for a "touch-sensitive" display. The input layer 506 may comprise one or more layers of input devices laid out in a matrix or grid pattern above the display layer 502. Adhesive layers may be used between the layers of the display screen 405.

FIGS. 6-13 illustrate exemplary embodiments of a graphical electronic display with an overmolded encapsulating perimeter retention portion. The molded perimeter retention portion may comprise an exterior bezel. Such a graphic electronic display securely retained within a molded bezel, as described herein, may be used as a replacement display for replacing displays in a variety of applications and environments. For example, such graphical displays with molded bezels may be used to mount displays found in automobile consoles. Such graphical displays and their molded bezels may come in a variety of sizes/dimensions to provide a flexible range of replacement sizes. As illustrated in FIGS. 6-13, the graphical electronic display includes a display body and an attached display cover. The display cover may also be referred to as a display screen. In any of the particular embodiments, the display cover or display screen may comprise a touch screen. That is, the display cover or screen may include input layers sandwiched between display layers and an upper protective layer(s).

FIG. 6 illustrates an exemplary encapsulation portion 606 that surrounds a display body 604 and an attached display cover 605. As illustrated in FIGS. 3A and 3B, such an encapsulation portion 606 may be implemented as a molded bezel (304) around the exterior of the display body and display cover. As illustrated in FIG. 6, the encapsulation portion 606 includes a retention feature 607, such as a projection, sized to fit in a matching portion of the display body 604. In one exemplary embodiment, the "matching portion" is a channel or receptacle or cavity formed in the display body 604 that matches the dimensions of the retention feature 607. As illustrated in FIG. 6, when the retention feature 607 is placed within the matching portion of the display body 604, the display body 604 and the attached display cover 605 are retained within bezel formed by the encapsulation portion 606. As discussed herein, the display cover 605 may be a transparent display screen, while the display body 604 may be a graphical display. As with the other embodiments discussed below, although encapsulation portion 606 is shown as a partial segment for ease of understanding, it should be appreciated that portion 606 may surround the entire perimeter of display body 604.

FIGS. 7A and 7B illustrate an exemplary encapsulation portion 706 that surrounds a display body 704 and an attached display cover 705. As illustrated in FIGS. 7A and 7B, the attached display cover 705 extends past the display body 704. That portion of the display cover 705 that extends past the display body 704 is substantially covered by an upper retention feature 707a. A lower retention feature 707b retains that extending portion of the display cover 705 between itself and the upper retention feature 707a. Note that as illustrated in FIGS. 7A and 7B, the lower retention feature 707b does not extend as far as the upper retention feature 707a. However, as illustrated FIGS. 7A and 7B, the extending portion of the display cover 705 is securely retained between the upper and lower retention features 707a, 707b.

In an alternative embodiment illustrated in FIG. 8, a lower retaining feature 807b substantially covers the underside of the display cover 705 that extends past the display body 704. In one exemplary embodiment, the encapsulation 706, 806 forms a molded bezel around the display body/display cover and extends completely around the display cover 705 and the display body 704. As discussed herein, the display cover 705 may be a transparent display screen, while the display body 704 may be a graphical display.

FIGS. 9A and 9B illustrate an exemplary encapsulation portion 906 that surrounds a display body 904 and an attached display cover 905. Such an encapsulation portion 906 may be implemented as a molded bezel around the exterior of the display body and display cover. As illustrated in FIGS. 9A and 9B, the attached display cover 905 extends past the display body 904, such that the display cover 905 extends completely around the display cover 905 and the display body 904. As illustrated in FIGS. 9A and 9B, the edge of the display cover 905 is modified (partially beveled or chamfered) such that a similarly shaped retention feature 907 of the encapsulation portion 906 engages with the modified edge of the display cover 905. As illustrated in FIGS. 9A and 9B, when the retention feature 907 of the encapsulation portion 906 is engaged with the modified edge of the display cover 905, the display cover 905 and the display body 904 are retained and supported by the encapsulation portion 906. FIG. 10 illustrates an alternative encapsulation portion with a squared off portion rather than the curved portion illustrated in FIGS. 9A and 9B. As discussed herein, the display cover 905 may be a transparent display screen, while the display body 904 may be a graphical display.

FIGS. 11A and 11B illustrate an exemplary encapsulation portion 1106 that surrounds a display body 1104 and an attached display cover 1105. Such an encapsulation portion 1106 may be implemented as a molded bezel around the exterior of the display body and display cover. As illustrated in FIGS. 11A and 11B, an edge of the attached display cover 1105 is flush with an edge of the display body 1104. As illustrated in FIGS. 11A and 11B, the edge of the display cover 1105 is modified (partially beveled or chamfered) such that a similarly shaped retention feature 1107 of the encapsulation portion 1106 engages with the modified edge of the display cover 1105, with the encapsulation portion 1106 being flush with the display cover 1105. It should be appreciated that alternative arrangements may be used for an encapsulation portion that is flush with a display cover, including omitting the edge chamfer retention feature 1107. For example, FIG. 6 illustrates an embodiment in which the encapsulation portion 606 is flush with the display cover 605. As illustrated in FIGS. 11A and 11B, the retention portion 1107 extends down and under the display body 1104, such that the retention portion 1107 of the encapsulation portion 1106 physically retains and supports the display cover 1105 and display body 1104. As discussed herein, the display cover 1105 may be a transparent display screen, while the display body 1104 may be a graphical display.

Figures 12A, 12B:
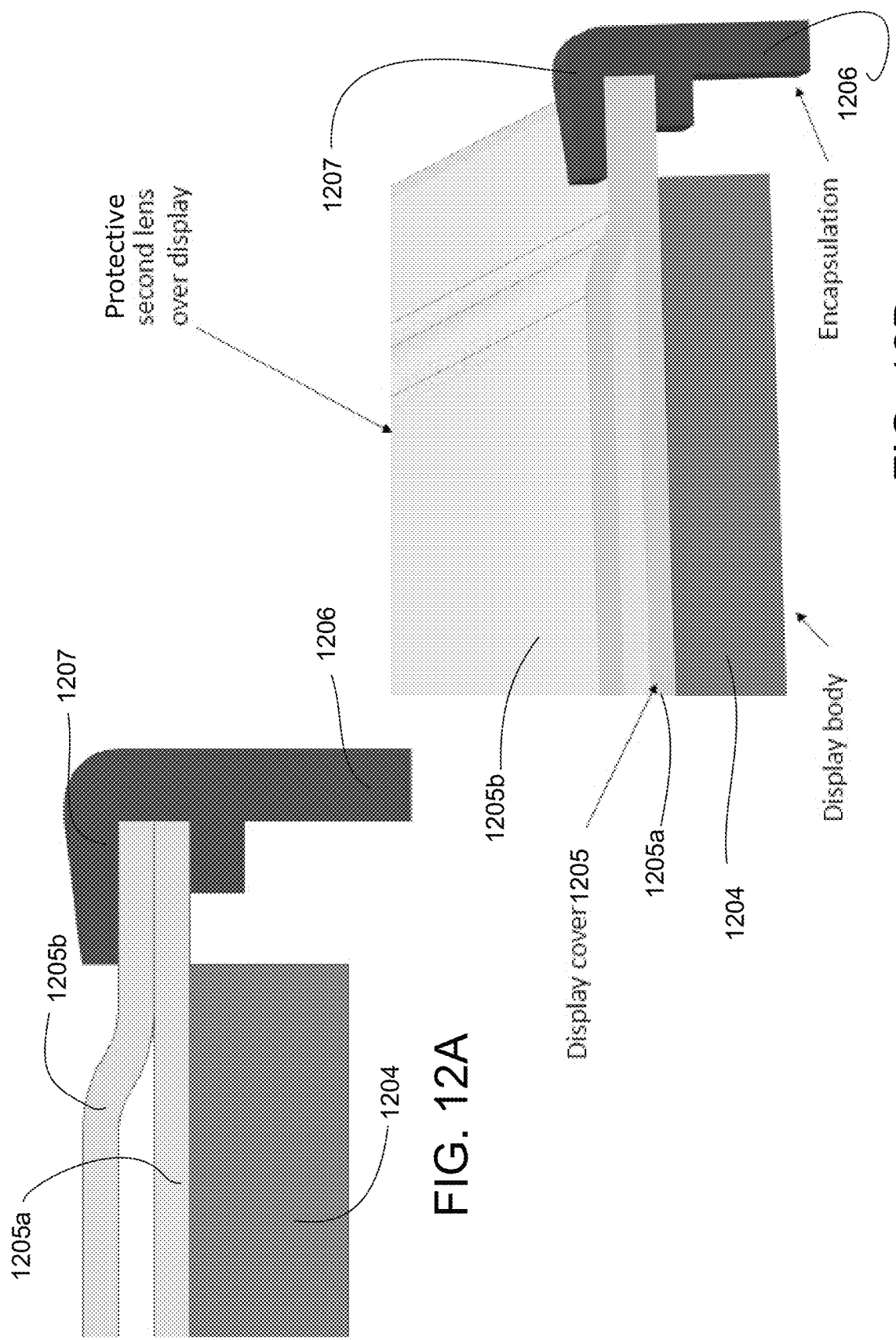
FIGS. 12A and 12B are a side view and side perspective view, respectively, of a display body encapsulation with retention feature according to an embodiment of the present invention.

FIGS. 12A and 12B illustrate an exemplary encapsulation portion 1206 that surrounds a display body 1204 and an attached display cover 1205. Such an encapsulation portion 1206 may be implemented as a molded bezel around the exterior of the display body and display cover. The retention feature 1207 of the encapsulation portion 1206 is similar to the upper and lower retention features 507a, 507b illustrated in FIGS. 7A and 7B. As illustrated in FIGS. 12A and 12B, the display cover 1205 includes a first display cover 1205a that is in direct contact with the display body 1204, as well as a second display cover 1205b that is a protective second lens that extends up and away from the first display cover 1205a to form a space between the two portions of the display cover 1205. As further illustrated in FIGS. 12A and 12B, the retention feature 1207 further sandwiches together edge portions of the first and second display covers 1205a, 1205b to retain the display cover 1205 and the display body 1204 (which is coupled to the display cover 1205). As discussed herein, the display cover 1205 may be a transparent display screen, while the display body 1204 may be a graphical display.

Figure 13:
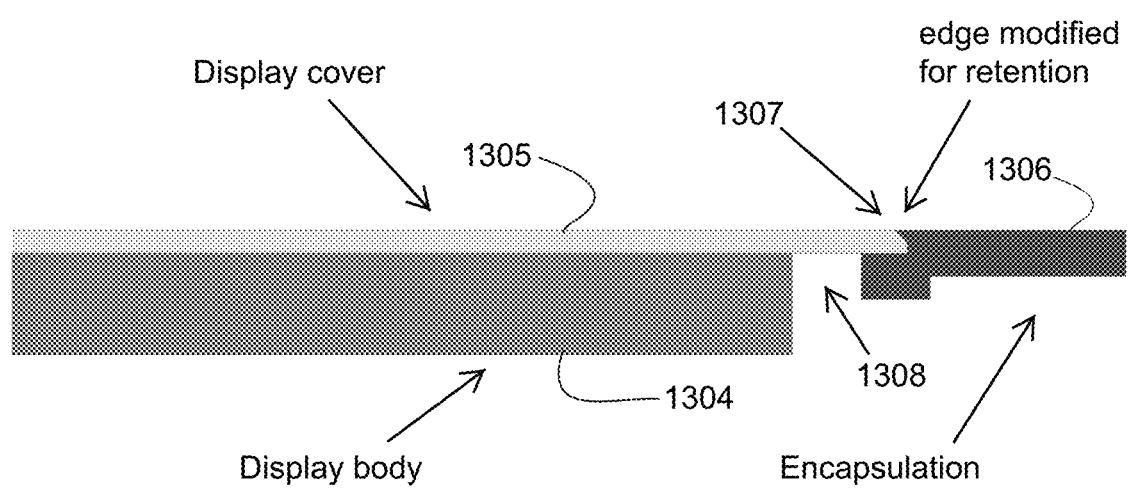
FIG. 13 is a side view of a display body encapsulation with retention feature according to an embodiment of the present invention.

FIG. 13 illustrates an exemplary encapsulation portion 1306 that surrounds a display body 1304 and an attached display screen or display cover 1305. Such an encapsulation portion 1306 may be implemented as a molded bezel around the exterior of the display body 1304 and the display cover. As illustrated in FIG. 13, the attached display cover 1305 extends past the display body 1304, such that the display cover 1305 extends completely around the display body 1304. As additionally illustrated in FIG. 13, a gap 1308 exists between the display body 1304 and the molded bezel 1306, where gap 1308 surrounds the display body 1304. As illustrated in FIG. 13, the edge of the display cover 1305 is modified (partially beveled or chamfered) such that a similarly shaped retention feature 1307 of the encapsulation portion 1306 engages with the modified edge of the display cover 1305. As illustrated in FIG. 13, the retention portion 1307 extends down and under the display cover 1305, such that the retention portion 1307 of the encapsulation portion 1306 physically retains and supports the display cover 1305.

As discussed herein, the display cover 1305 may be a transparent display screen, while the display body 1304 may be a graphical display.

Additional exemplary embodiments are also possible for other encapsulation embodiments similarly configured to retain and support a graphic display within a molded bezel, whether they be display devices with electronic displays (such as liquid crystal displays), or user input control panels. As discussed herein, such display devices with molded exterior bezels may be used as replacement displays for a variety of applications.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The invention claimed is:

1. A console display configured to fit in an opening of an automotive console or dashboard, the console panel comprising:
    a housing comprising a display device, wherein the display device includes a display screen having an outer perimeter;
    wherein the housing is configured to retain and support the display device within the housing;
    wherein the housing comprises a retaining portion configured to position the housing within the opening; and
    wherein the retaining portion is a molded encapsulation portion overmolded to and contacting the outer perimeter of the display screen to encapsulate the display screen.

2. The console display of claim 1, wherein the retaining portion extends outwardly from the outer perimeter of the display screen and is configured to retain and support the housing within the opening.

3. The console display of claim 1, wherein the encapsulation portion comprises a retention feature configured to retain and support the housing within the encapsulation portion.

4. The console display of claim 3, wherein the housing comprises a complementary retention feature, and wherein the retention feature is configured to at least partially engage with the complementary retention feature.

5. The console display of claim 1, wherein the display device is one of a liquid crystal display (LCD) and a light emitting diode (LED) display.

6. The console display of claim 1, wherein the display device comprises one or more user inputs.

7. An electronic display, said electronic display comprising:
    a body portion and a display cover coupled to the body portion, wherein the body portion includes display electronics, and wherein the display cover comprises a touch screen configured to provide user input to the display electronics and at least a portion of the display cover is adhered to at least a portion of the body portion, and wherein the display cover extends over the body portion such that a perimeter of the display cover extends to at least a perimeter of the body portion; and a molded encapsulation portion molded to the display cover and disposed about at least a portion of the perimeter of the display cover;

wherein the molded encapsulation portion comprises a bezel.

8. The electronic display of claim 7, wherein the bezel is configured to retain and support the body portion in an opening on a vehicle.

9. The electronic display of claim 8, wherein the bezel is configured to position the body portion in the opening.

10. The electronic display of claim 7, wherein the molded encapsulation portion is also molded to the body portion and disposed about at least a portion of the perimeter of the body portion.

11. The electronic display of claim 10, wherein the molded encapsulation portion comprises a retention feature configured to retain at least one of the display cover and the body portion within the molded encapsulation portion.

12. The electronic display of claim 11, wherein the body portion comprises a complementary retention feature, and wherein the retention feature is configured to at least partially engage with the complementary retention feature of the body portion.

13. The electronic display of claim 11, wherein the display cover comprises a complementary retention feature, and wherein the retention feature is configured to at least partially engage with the complementary retention feature of the display cover.

14. The electronic display of claim 13, wherein the body portion comprises a complementary retention feature, and wherein the retention feature is configured to at least partially engage with at least one of the complementary retention feature of the display cover and the complementary retention feature of the body portion.

15. The electronic display of claim 7, wherein the body portion is an electronic display device, wherein the display cover is positioned over a display screen of the electronic display device, and wherein the electronic display device is one of a liquid crystal display (LCD) and a light-emitting diode (LED) display.

16. The electronic display of claim 7, wherein the body portion comprises one or more user inputs.

17. The electronic display of claim 7, wherein the display cover comprises at least one protective lens.

18. The electronic display of claim 7, wherein the display is mounted within an opening on a vehicle, wherein the opening is located on a console, an interior door panel, or a rear seat portion of a vehicle, and wherein the opening comprises an exterior facing opening on a vehicle.

19. An electronic display, said electronic display comprising:

a display body and a display screen having an outer perimeter, wherein the display screen is mounted to the display body;

an encapsulation portion overmolded to and directly contacting at least the outer perimeter of the display screen to encapsulate the display screen;

wherein the encapsulation portion extends outwardly from the body portion.

20. The electronic display of claim 19, wherein the encapsulation portion is further overmolded to and contacts the display body.

21. The electronic display of claim 19, wherein the display screen comprises a plurality of layers.

\* \* \* \* \*